United States Patent [19]

Chiao et al.

[11] Patent Number: 5,515,212

[45] Date of Patent: May 7, 1996

[54] VERY HIGH-DENSITY DISKETTE FORMAT METHOD AND COMPUTER IMPLEMENTED PROCESS

[75] Inventors: James Chiao, Saratoga; Jimmy D. Godwin, San Jose; Alton B. Otis, Jr., San Francisco; Andrew M. Rose, Mountain View; Roger O. Williams, Fremont; Stephen P. Williams, Morgan Hill; Mark E. Strysko, San Jose, all of Calif.

[73] Assignee: Insite Peipherals, Inc., San Jose, Calif.

[21] Appl. No.: 111,778

[22] Filed: Aug. 25, 1993

Related U.S. Application Data

[63] Continuation of Ser. No. 611,420, Nov. 9, 1990, abandoned.

[51] Int. Cl.⁶ .................................................. G11B 5/596
[52] U.S. Cl. .......................................... 360/77.03; 360/48
[58] Field of Search ................................... 360/58, 77.07, 360/121, 48, 77.03, 75

[56] References Cited

U.S. PATENT DOCUMENTS

| | | | |
|---|---|---|---|
| 3,034,111 | 5/1962 | Hoagland et al. | 360/77.07 |
| 3,631,426 | 12/1971 | Appelt et al. | 360/47 |
| 3,729,725 | 4/1973 | Denney et al. | 360/48 |
| 4,371,960 | 1/1983 | Kroiss | 360/77.04 X |
| 4,791,622 | 12/1988 | Clay et al. | 360/53 X |
| 4,933,795 | 6/1990 | Nigam | 360/121 |
| 4,961,123 | 10/1990 | Williams et al. | 360/77.03 X |
| 5,018,124 | 5/1991 | Ogasawara et al. | 369/44.33 |
| 5,111,444 | 5/1992 | Fukushima et al. | 369/58 |
| 5,124,963 | 6/1992 | Ando | 369/58 X |
| 5,136,569 | 8/1992 | Fennema et al. | 369/58 |
| 5,142,626 | 8/1992 | Arnold et al. | 369/58 X |

FOREIGN PATENT DOCUMENTS

| | | |
|---|---|---|
| 0097774 | 4/1983 | European Pat. Off. . |
| 0269381 | 11/1987 | European Pat. Off. . |
| 0311859 | 9/1988 | European Pat. Off. . |
| 0344759 | 5/1989 | European Pat. Off. . |
| 0368268 | 8/1989 | European Pat. Off. . |

OTHER PUBLICATIONS

AT&T "UNIX System V/386 Release 3.2 System Administrator's Guide" ©1989, pp. 6-12-6-23.

Comer et al. "Operating System Design vol. 1: The XINU Approach" ©1989 p. 309.

Angermeyer et al. "MS-DOS Developer's Guide" ©1986 pp. 285-303.

Primary Examiner—Aristotelis Psitos
Assistant Examiner—James T. Wilson
Attorney, Agent, or Firm—Law Offices of Thomas E. Schatzel

[57] ABSTRACT

A diskette comprising a jacket, a liner material disposed within said jacket, a flat circular media having a magnetic coating on both sides disposed within said liner material, a hub attached at the center of said media, a plurality of servo grooves on at least one of said sides of said media that have stitched patterns that will alternate on-and-off at twenty kilohertz in the presence of a constant, unmodulated light source. The diskette is magnetically formatted with reference and data tracks recorded in such a way that extremely accurate position determinations can be made by looking at the analog amplitude of the detected tracks and comparing them at different head positions. The innermost tracks contain redundant copies of a disk mapping table that comprises data for a media type code, a sector size code, a sector interleave code, a total track count, a reassignment area starting address, a data area starting address, a total sector count, an update count, and a reassignment table having at least room for 250 entries of three bytes each.

1 Claim, 2 Drawing Sheets

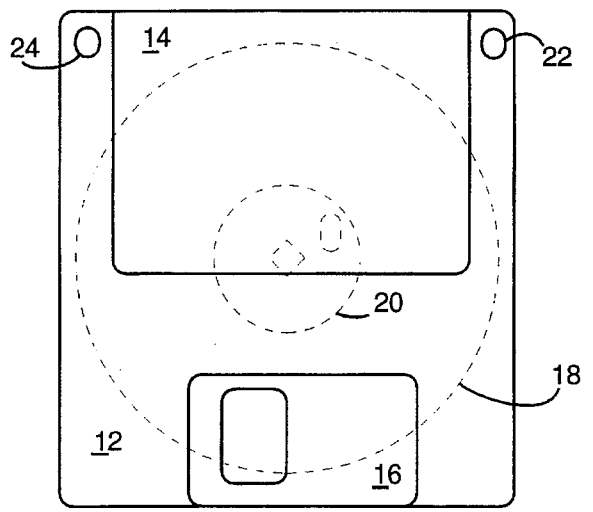
Fig_1
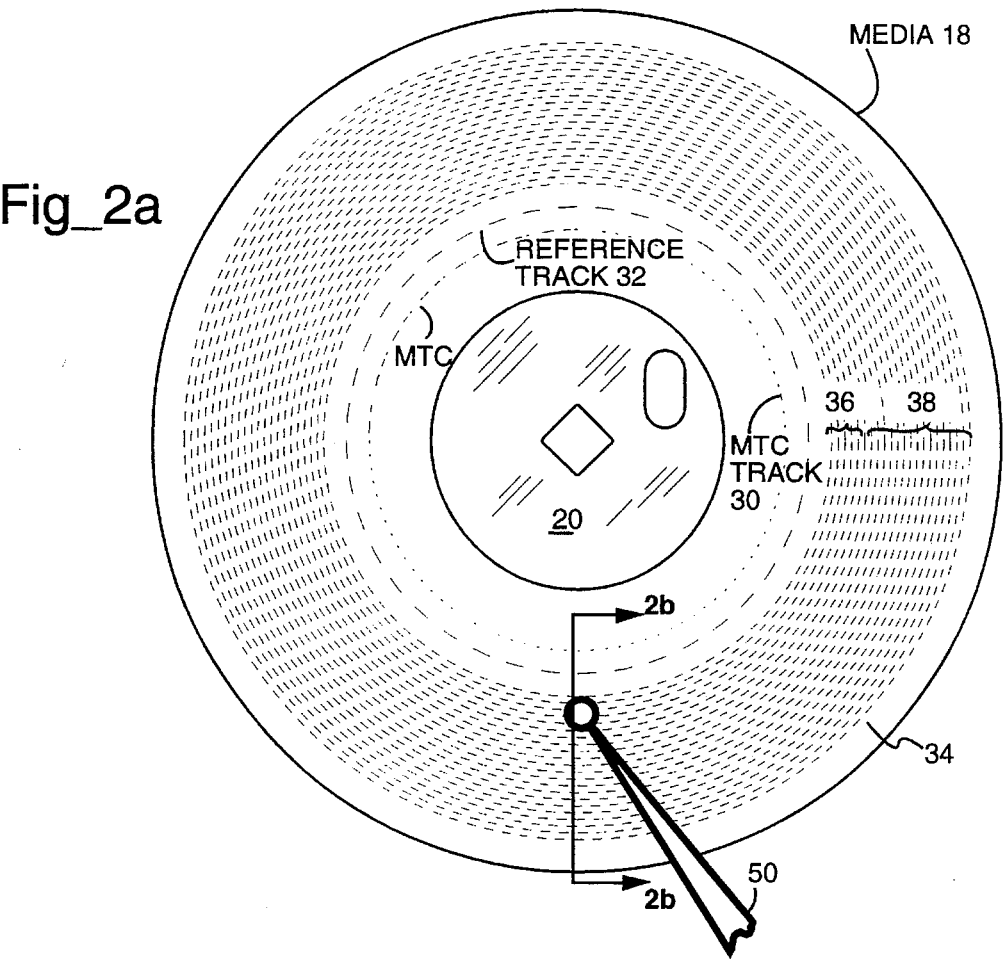
Fig_2a
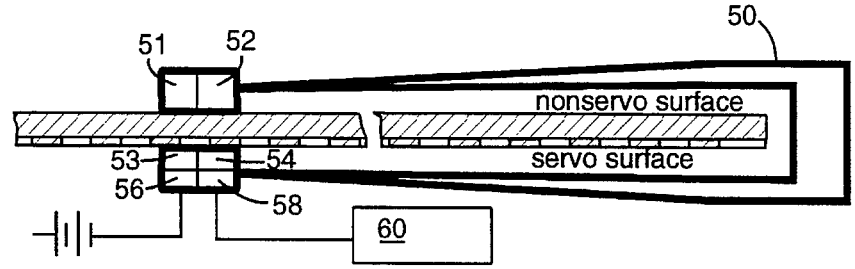
Fig_2b

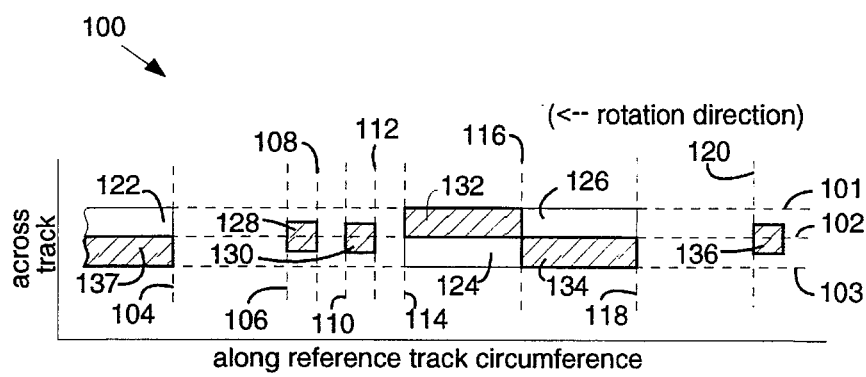
Fig_3
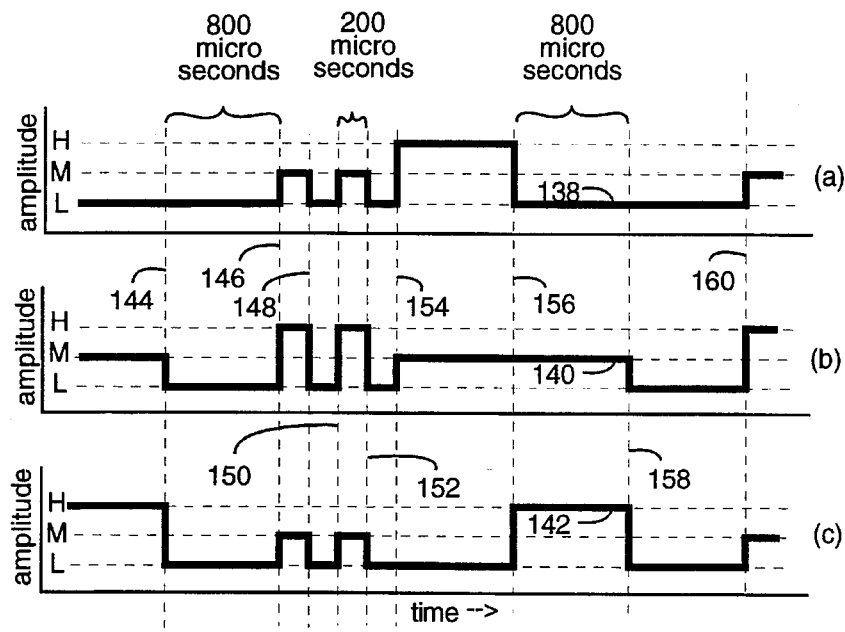
Fig_4
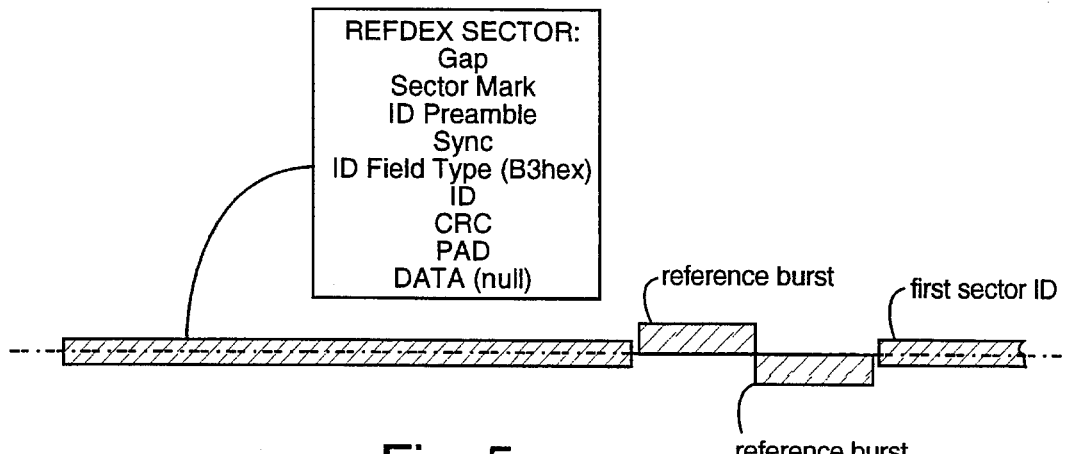
Fig_5

VERY HIGH-DENSITY DISKETTE FORMAT METHOD AND COMPUTER IMPLEMENTED PROCESS

This is a continuation of application Ser. No. 07/611,420, filed on Nov. 9, 1990, now abandoned.

BACKGROUND OF THE INVENTION

1. Field of the Invention

The invention relates generally to magnetic disk drives and more specifically to diskette formats in very high track density drives and systems.

2. Description of the Prior Art

Continual advances in floppy disk technology have allowed the rapid migration from eight inch, to 5.25 inch to 3.5 inch diskettes. Originally, 5.25 inch diskettes held only 360K bytes of data, but higher track densities and more efficient recording formats have allowed the smaller 3.5 inch diskette to store as much as 1.44M bytes in the recent high density (HD) format. Such rapid migration has caused severe interoperability concerns, because of the physical incompatibility between the traditional formats. Advances in floppy disk technology have not stayed still. By embedding optical servo information in an otherwise standard 3.5 inch micro-floppy diskette, storage capacities of twenty megabytes and beyond are possible. The Micro Standards Committee, sponsored by the Microcomputer Managers Association, announced at COMDEX/Spring 1989 a 10-month study of proposed new formats to replace the aging 1.44M byte diskette. (See, "Draft White Paper on a New Standard for Very-High-Density Diskette Drives," p. 10–1449 Feb. 5, 1990, published by the Micro Standards Committee, 50 W. 34th St., Suite 23C7, New York, N.Y. 10001.) The result was to recommend a 20.9M byte optical-magnetic format that was judged to be superior on every criterion rated.

Higher density disks have resulted from ever increasing track densities. The more concentric data tracks that can be packed into an area on a given disk size, the more data can be stored. But increasing track densities compound the problems in positioning a read/write head over the proper track. Stepper motors have been used in low track density drives to position the heads, but stepper motor positioning systems do not have the accuracy required for high track densities. Magnetic servo tracks embedded between data tracks or on a specialized surface in a multi-surface disk disk have also reached their limits. The prior art includes optical servo positioning methods that offer high track densities and good performance.

SUMMARY OF THE PRESENT INVENTION

It is therefore an object of the present invention to provide a diskette media with a format and highly reliable positioning means that allows for very high density magnetic data storage.

Briefly, an embodiment of the present invention is a diskette comprising a jacket, a liner material disposed within said jacket, a flat circular media having a magnetic coating on both sides disposed within said liner material, a hub attached at the center of said media, a plurality of servo grooves on at least one of said sides of said media that have stitched patterns that will alternate on-and-off at twenty kilohertz in the presence of a constant, unmodulated light source. The diskette is magnetically formatted with reference and data tracks recorded in such a way that extremely accurate position determinations can be made by looking at the analog amplitude of the detected tracks and comparing them at different head positions.

An advantage of the present invention is that data is organized on a diskette in a highly efficient and reliable manner.

Another advantage of the present invention is that a standard for interoperability of diskettes exchanged between various manufacturers is defined.

Another advantage of the present invention is that an extremely low undetected error rate is achieved Another advantage of the present invention is that most of the seek information needed to position a read/write head properly will be immediately available from a sector ID field.

These and many other objects and advantages of the present invention will no doubt become obvious to those of ordinary skill in the art after having read the following detailed description of the preferred embodiments which are illustrated in the various drawing figures.

IN THE DRAWINGS

FIG. 1 is an elevational view of a prior art diskette in a hard plastic case and shows the media and hub that rotates within;

FIGS. 2(a)–(b) illustrate the relationship of the media of FIG. 1 to the servo and nonservo side read/write heads and optical position detector. FIG. 2(a) is a elevational view of the optical servo side media and hub inside the diskette of FIG. 1. (Only one side has indelibly embossed, optically visible features.) FIG. 2(b) is a cross-sectional view of the media and heads taken along the line 2b–2b in FIG. 2(a);

FIG. 3 is a top elevational view of a portion of the reference track. Both mechanically embossed and magnetically recorded features are illustrated;

FIGS. 4(a)–(c) are amplitude waveforms of signals received by a magnetic read/write head positioned at three different places over the reference track. FIG. 4(a) represents a typical waveform received when the read/write head is positioned such that it follows nearest to path 101 shown in FIG. 3. FIG. 4(b) represents a typical waveform received when the read/write head is positioned such that it follows the center of the reference track, which is nearest to path 102 shown in FIG. 3. FIG. 4(c) represents a typical waveform received when the read/write head is positioned such that it follows nearest to path 103 shown in FIG. 3; and FIG. 5 is a diagram of the refdex sector that begins each data track.

DETAILED DESCRIPTION OF THE PREFERRED EMBODIMENTS

FIG. 1 illustrates a diskette of the present invention, referred to by the general reference numeral 10, which comprises a jacket 12, a label 14, a shutter 16, and a media 18. A liner (not shown) is disposed within jacket 12 and is made of a material that lubricates and cleans media 18. Media 18 is attached to a hub 20 and has a barium ferrite coating on both top and bottom surfaces (not shown for clarity in showing the other elements below). A hole 22 would normally be provided with a mechanical switch to indicate to a disk drive that diskette 10 is, or is not, write-protected, but in the present very high density (VHD) format, this hole is permanently set to indicate write protection in standard media drives. A hole 24 would normally indicate that diskette 10 is a high density (HD) format. The double density (DD) format is indicated by omitting hole 24. In diskette 10, hole 24 is preferably used as the write protect switch location.

FIG. 2(a) illustrates, with circles drawn with dashed lines, that media 18 comprises indelibly embossed features that include a media type code (MTC) track 30, a reference track 32, and approximately 900 servo grooves 34 (numbered 0 to 899), all of which are concentric with one another. These indelibly embossed features consist of dashed lines having various patterns, depending on the track it is associated with. Servo grooves 34 are the simplest, with a 50% duty cycle pattern consisting of "stitches" that will generate a twenty kilohertz squarewave in an optical detector at the preferred media 18 rotational rate of 720 RPM. (Elements on the nonservo side that correspond to servo side elements are hereinafter numbered with prime notation; therefore reference track 32 on the servo side has a matching reference track 32' on the nonservo side in the same cylinder.) Interlaced into the spaces between the servo grooves 34, there are magnetically recorded a disk mapping table (DMT) track 36 and a plurality of magnetically recorded data tracks 38. A second DMT track 36' and plurality of data tracks are magnetically recorded on the nonservo surface at the same cylinder positions as those on the servo side. Presently, only one magnetically recorded track (36 or 38) is recorded between any two adjacent servo grooves 34. Certain minimum distances between magnetic data tracks must be maintained to avoid adjacent channel interference. The servo grooves 34 are used in a disk drive system to accurately position a pair of read/write head assemblies 50 comprising, on the nonservo side, a high density/double density (HD/DD) 5000 microinch gap magnetic core 51, a very high density (VHD) 600 microinch gap magnetic core 52, and on the servo side a VHD core 53, and a HD/DD core 54. The positioning system preferably has a conventional stepper motor that will position the assembly 50 to HD/DD track positions, and a finer voice coil positioning sub-system that rides on the stepper motor system and is activated for VHD use. The HD/DD cores 51 and 54 are used with the voice coil positioning sub-system in combination with the stepper motor system to read and write standard double density (800K) and high density (1.44M) diskettes. A reflective sensor system is used to provide a linear positioning scheme (not locked to the rotational surface) that compensates for offsets between the upper and lower heads, and that allows for trim-erasure before writing. Table One lists the physical track locations of the above from the center of media 18 in an exemplary embodiment. Table Two lists other preferred dimensions relating to the above grooves and tracks. There are 26 reference segments in the reference track and 1666 stitches in each servo track.

TABLE ONE

| MTC Track (cyl-6) | 21.9390 mm |
| Reference Track (cyl-3) | 22.0000 mm |
| Data Track 0 (cyl 0) | 22.0610 mm |
| Servo Groove 0 | 22.0510 mm |
| Servo Groove 899 | 40.3906 mm |

TABLE TWO

| Servo Groove Width | 0.0051 mm |
| Servo Groove Pitch | 0.0204 mm |
| Stitch Length (Groove 0) | 0.0412 mm |
| Stitch Length (Groove 899) | 0.0755 mm |

TABLE TWO-continued

| Reference Track Segment Width | 0.0183 mm |
| Reference Track Segment Length | 1.3175 mm |
| Reference Track Gap Length | 2.6551 mm |

A light source 56 and a light detector 58 are carried on the lower head assembly. Servo grooves 34 are embossed on media 18 by laser etching a dashed pattern concentric rings. The embossed areas of media 18 will reflect less light than will the un-embossed areas. The embossed areas on the servo surface of media 18 (FIG. 2(b)) can be sensed by the optical detector 58. Differences in the absolute position of the upper and lower magnetic cores 51–54 are unavoidable. At the fine track-to-track dimensions used in the present embodiment, the track positioning arrived at for one surface cannot be relied upon for reading or writing the opposite surface. Separate seek operations for each surface are mandatory. The positioning of the nonservo side read/write head assembly is accomplished by first using core 52 to seek the center of reference track 32'. The positioning of the servo side read/write head is accomplished by using core 53 to seek the center of reference track 32. The manufacturing difference between the radial positions of magnetic cores 52 and 53 is preferably held to less than ±3 tracks, or 2,400 microinches. Typical manufacturing tolerances will be 200–300 microinches. An electronic storage means, such as a RAM memory in a microprocessor, is used to keep track of the above offset information. Light source 56 is preferably an LED, however, a fiber optic cable could be used to pipe light in from a bulkier source than an LED. A twenty kilohertz bandpass filter 60 removes background light and spurious reflections, such as those associated with common media defects. The detector 58 has a pulsed output when the tip of head assembly 50 is positioned over an optical servo track 34. Detector 58 has a group of four diamond-shaped detection areas for improving positioning response. Preferably, the dashed pattern of the servo grooves 46 is such that a 50% duty cycle (dashes substantially equal to the space between them) is detected at a frequency of twenty kilohertz. Background and other spurious light will have frequency components significantly apart from twenty kilohertz.

A media type code containing 37 bit cells is placed on MTC track 30, and occupies approximately 28% of the track 30. The remainder of track 30, in the preferred embodiment, contains ten vendor sectors. Each vendor sector contains 1024 bytes. The format is the same as that of the data sectors (described above and below). All ten sectors contain the same data. The data format for the vendor sectors is custom and unique to the producer of the particular media. The first vendor sector starts fifty bytes after the last MTC bit cell. The media type code is a laser etched or embossed pattern that is read by the drive to determine various information about the physical characteristics of media 18. The MTC track 30 is located on the servo surface and is etched so that its centerline is coincident with the centerline of magnetic cylinder "-6" (Table One lists an exemplary location for the radius of "cyl-6"). The MTC consists of a sequence of 37 bit cells. Each bit cell contains a single variable length etched segment having a radial width equal to that of a reference track segment (approximately 700 microinches). The bit cells have an angular displacement equivalent to twelve servo stitches or, when media 18 is rotating at 720 RPM, a period of 600 microseconds. A sync cell has 600 microseconds of etch for synchronization, a one data bit cell has 400 microseconds of no etch followed by 200 microseconds of etch, and a zero data bit cell has 200 microseconds of no etch followed by 400 microseconds of etch. The bit cells are located contiguously and in the order given in Table Three. The CRC is computed from the preceding 32 data bits using the polynomial $X^2+1$ with the starting value of $03_{hex}$.

TABLE THREE

| CELL # | TYPE | CONTENTS |
|---|---|---|
| 1 | Sync | indicates start of the MTC |
| 2–33 | Data | data bits 31–0 |
| 34–37 | Data | CRC bits 3–0 |

The MTC may start at any point on the circumference of MTC track 30. The information fields within the MTC are illustrated in Table Four.

TABLE FOUR

| DATA BITS | CONTENT | NUMBER OF BITS | BYTE NO. |
|---|---|---|---|
| 31–24 | Machine Compatibility | 8 | 3 |
| 23–20 | Capacity | 4 | 2 |
| 19–17 | Media | 3 | 2 |
| 16 | Magnetic Data | 1 | 2 |
| 15–14 | Security | 2 | 1 |
| 13–8 | Servo | 6 | 1 |
| 7–0 | reserved | 8 | 0 |

FIG. 3 illustrates a portion of a circular reference track 32 and comprises a plurality of reference sectors. A magnetic read/write head is, for purposes of illustration here only, positioned in three different places such that a trio of paths 101–103 will be followed. Track 32 is divided into segments by lines 104–120. A plurality of rectangular areas 122, 124, and 126 represent portions of the media that have been etched away, or embossed by laser or hydraulic press means. Areas 122, 124, and 126 are typical of all the other such embossed areas distributed along reference track 32 (and are therefore permanent and indelible features of the media). Areas 124 and 126 are associated with a single reference sector that begins at line 104 and ends at line 118. Areas 124 and 126, together with all other such embossed areas, have had the magnetic coating on the media eaten away or indented such that the response of a magnetic read/write head is reduced in those areas. The distance from line 104 to line 106 is chosen to take 800 microseconds to pass the read/write head at the preferred rotational speed of 720 RPM. Similarly, the distance from line 106 to line 108 is chosen to take 200 microseconds for the read/write head to pass. Initially, the media will be DC erased and a continuous amplitude AC waveform written down in the general area of reference track 32. The magnetic read/write head is then slowly swept across paths 101–103. Since embossed areas 122, 124, and 126, among others, have reduced magnetic recording and playback abilities, the continuous amplitude AC waveform will be seen to have dips in amplitude at playback. If the read/write head is positioned along path 103, short 800 microseconds dips will be observed every 3200 microseconds. If the read/write head is positioned along path 101, short 800 microseconds dips will also be observed every 3200 microseconds but skewed in time from that of path 103 because of the offsets of exemplary areas 124 and 126. If the read/write head is positioned along path 102, longer 1600 microseconds dips will be observed every 3200 microseconds because the read/write head will average the dips in exemplary embossed areas 124 and 126. A magnetic read/write head can therefore be employed to precisely determine the exact position of path 102, which is also the center of reference track 32. Once determined, formatting means uses an index means connected to the shaft/hub of the diskette drive to plot the exact position of all embossed areas (e.g., areas 122, 124, and 126). A timing table is constructed such that a pair of 200 microseconds synch burst 128 and 130 can be recorded 800 microseconds and 400 microseconds, respectively, in front of the leading edge of the first embossed area (e.g., area 124) of a reference sector. The head is shifted to path 101 to record a mark 132, and shifted again to path 103 to record a mark 134. Thereafter, sync burst 128 and 130, and marks 132 and 134 can be used to find the position of path 102 as described below for FIGS. 4(a)–(c).

FIGS. 4(a)–(c) illustrate a much faster way to detect the position of the reference track 32 or 32' after it is magnetically formatted as described above. The process of DC erasing and AC recording the reference track 32, described above, is time consuming. Finding the magnetic features, sync burst 128 and 130, and marks 132 and 134, can be performed rapidly and precisely (due to the significant amplitude differences between the DC erasure and burst areas). A waveform 138 represents the signal detected by the read/write head traveling along path 101. A waveform 140 represents the signal detected by the read/write head traveling along path 102. And a waveform 142 represents the signal detected by the read/write head traveling along path 103. A plurality of times 144–160 correspond to the times lines 104–120 pass under the read/write head. Sync burst 128 and 130 will cause two pulses beginning at times 146 and 150. These signal a servo means that reference marks 132 and 134 will follow. The relative amplitudes received for reference marks 132 and 134 will depend on the radial position of the read/write head. When positioned precisely over path 102, a waveform between times 154 and 158 will be flat, such as is shown for waveform 140.

Once the position of reference track 32 has been determined, all the magnetic data tracks on both the servo side of the media can be laid down. On the servo side, data tracks are formatted between servo grooves 34. On the nonservo surface, there are no servo grooves and the read/write head on the nonservo side can be askew of the radial position of the read/write head on the servo side. A pattern identical to the magnetic reference track, described above for the servo surface, is written on the nonservo surface using the same positions of the read/write heads. The reference track 32 on the servo surface is formatted and verified first, then the reference track 32' on the nonservo surface is formatted and verified second. The actual location of the nonservo surface reference track (32') is a function of the radial offsets of the respective heads and their magnetic cores. Similarly, the data tracks on the servo surface are formatted and verified first and, without moving the heads, the nonservo surface is formatted and verified. On playback using a different drive than the drive that formatted a diskette, it is very likely that the magnetic read/write heads for the servo and nonservo surfaces will have a radial offset different than the drive that wrote the original format. The positioning of the nonservo side read/write head is therefore accomplished by seeking the center of reference track 32'. The positioning of the servo side read/write head is therefore accomplished by seeking the center of reference track 32. The difference is preferably held to less than ±3 tracks, or 2,400 microinches. Typical manufacturing tolerances are 200–300 microinches. A storage means is used to keep track of the above offset information once determined by a drive after a new (formatted) diskette has just been introduced. As a consequence of the offset between servo and nonservo data tracks, switching between surfaces requires more than a head select, it also requires a seek operation.

Once the reference tracks 32 and 32' have been located on each surface, a drive (during format) will initially DC erase the data track areas on both sides. It does this by moving the heads on each side to the data track centers and half way between those centers and DC erasing both surfaces at each of data track positions 34. Then the location of the respective reference tracks 32 and 32' are located again (because there may have been some thermal or other expansion) and a format pass is started. Each format pass comprises AC erasing (to remove DC bias), laying down a maximum number of ID fields (beginning at index) with no data in the sectors, and return to write down a first certification pattern and then readback the first certification pattern twice with different window margins in the read channel. (A certification pattern is a pattern that can be laid down that will assist in the finding of any flaws in the media.) Then a determination is made of whether or not any sectors could not be found for writing, or failed certification. If there are any, the sectors with defects are mapped out of the active available area by laying down a new set of ID fields, consecutively numbered, but which physically skip the flawed areas. The ID fields for the flawed sectors are retained, because it is useful for seeking, but codes in the ID field indicate that no data is in the sector. It is therefore possible that each data track can have a variable number of sectors.

The format of each of the above sectors in a data track begins with the index which occurs once each revolution of the media at some arbitrary point. The formatting of tracks and their sectors is commenced at the index so that near the end of the track, the last remaining sectors won't overwrite the first sectors because the near exact rotational period (time from index to index) is available and that period of time can be precisely partitioned to fit in the sectors that need to be written. The rotational period is measured to determine how many bytes of inter-sector gap pattern must be written between the standard set of twenty-seven sectors per track (for 512 byte sectors). (Inter-sector gaps are provided in soft sectored formats to allow for a certain speed mismatch between a drive that formatted a diskette and a drive that rewrites a sector in a previously formatted track.) The usual number of bytes of gap is that which fills an area two times the variability in the speed tolerance of the drive times the number of data bytes in the preceding sector. The present invention reduces this margin to less than 1.1 times the speed tolerance. The actual inter-sector gap written will vary in byte increments to accommodate the particular rotational period measured at format time. Because there is less total inter-sector gap, space is made available for a short "refdex" sector. ("Refdex" is coined here for the present invention.) Without the refdex sector, the reference track 32 or 32' would have to be checked at periodic intervals while doing write operations and every time a read error occurs. The purpose of this is to verify and, if necessary, adjust the track center alignment to accommodate for thermal drift. Each check of the reference track reduces system performance because there are two seek operations involved.

Referring now to FIG. 5, the refdex sector comprises a standard sector ID followed by two offset reference bursts. The ID field is marked to indicate that the reference bursts follow. The reference bursts alternate in phase between odd and even numbered cylinders to prevent overlap. The offset servo bursts and their detection are similar to marks 132 and 134 and the finding of reference track 32 discussed above. The two offset bursts allow an analog measurement to be taken to determine whether or not the read/write head is at a data track's center. Preferably, the refdex sector is not used to correct offset, but is used simply to determine whether a drift has occurred. The advantage of the refdex sector is that it can be read in the same pass that its associated data track is being read. No additional data latency occurs due to a check of the refdex sector. Preferably, many samples of the refdex sector will be taken from several tracks and an analysis of any drift trend made.

A preferred format, illustrated in Table Six, provides twenty megabytes and uses 1,7 RLL encoding. The preferred method of encoding is illustrated in Table Five. Pairs of NRZ data bits are encoded into and decoded from triplets of 1,7 RLL bit cells. Data bytes are preferably encoded by left shifting.

TABLE FIVE

| NRZ | 1,7 RLL* |
|---|---|
| 0000 | 010000 |
| 0001 | x00001 |
| 0010 | x00000 |
| 0011 | 010001 |
| 01 | x00 |
| 10 | 010 |
| 11 | x01 |

*note:
0 indicates a bit cell without a flux transition.
1 indicates a bit cell containing a flux transition.
x indicates the complement of the preceding encoded bit cell.

Table Six, below, outlines the format of a data track. Index is a signal provided by the drive hardware once per revolution of media 18. Immediately following the index are eight bytes of gap pattern. The gap pattern is a repeating 3T sequence (—1001001—), where T is the preferred bit cell time of 416.6 nanoseconds. Following the first gap is the refdex sector, described above, and eight more bytes of gap pattern. Following the second gap are N data sectors and a final gap area to the next occurance of index.

TABLE SIX

| OVERALL DATA TRACK FORMAT |
|---|
| Index |
| Gap |
| Refdex Sector |
| Gap |
| Data Sector 0 |
| (see table seven) |
| Data Sector 1 |
| (see table seven) |
| — |
| Data Sector N-1 |
| (see table seven) |
| Gap to next index |

Table Seven, below, diagrams the format of a data sector. The ID field identifies the sector and the data field stores the associated data. The trailing gap pattern accommodates rotational speed variation during data rewrite as previously described. The data and refdex sector ID fields have the same format.

TABLE SEVEN

| DATA SECTOR FORMAT |
|---|
| ID Field |
| (see table eight) |
| Data Field |

TABLE SEVEN-continued

DATA SECTOR FORMAT (see table eleven)
Gap

Table Eight, below, details the format of an ID field. The ID field consists of a sector mark, a preamble (16 bytes of 2T pattern —10101—), a sync pattern (two bytes) an ID field type code (one byte), a sector ID (seven bytes), an error detecting code (EDC of two bytes), and a pad (~1.5 bytes, before the write splice). The sector mark is an illegal 1,7 RLL encoding consisting of three consecutive 12T patterns. In terms of individual bit cells, the gap to sector mark to ID preamble sequence appears as follows:

```
--10010010000000000010000000000010000000000010101------
--gap-->|<---------sector mark----------->|<-preamble--
```

The sync pattern establishes when 1,7 RLL decoding is to begin and consists of the 24 bit cell sequence $420911_{hex}$. Synchronization is "fault tolerant" in that when any four of the six 4-bit groups are simultaneously detected, decoding begins. The first decoded byte is the ID field type code, which is NRZ $B3_{hex}$. The EDC field uses the polynomial $X^{16}+X^{12}+X^5+1$ with a starting value of zero. The EDC computation includes the ID field type code and the sector ID bytes. The pad is written as NRZ $00_{hex}$.

TABLE EIGHT

ID FIELD FORMAT

Sector Mark
Preamble
Sync Pattern
ID Field Type Code
Sector ID
(see table nine)
EDC
Pad Table Nine, below, details the seven byte sector ID shown above in Table Eight. A one bit track location code (TLC) uniquely identifies a plurality of disk mapping table tracks (located on both surfaces for redundancy) and vendor sectors on the MTC track from the ordinary data tracks. The TLC helps prevent an accidental overwriting of a disk mapping table sector or a vendor sector.

TABLE NINE

SECTOR ID FIELD

| 0 | TLC | MTA 14-8 |
|---|-----|----------|
| 1 |     | MTA 7-0  |
| 2 | SSC | 0   1   TSA 19-16 |
| 3 |     | TSA 15-8 |
| 4 |     | TSA 7-0  |
| 5 |     | TSC      |
| 6 |     | TSO      |

A magnetic track address (MTA) uniquely identifies the data tracks on the media. The MTA numbering begins with the first data track closest to the reference track on the servo surface being "0", the the first track just opposite on the nonservo surface being "1", and so on to the outer most data track. The MTA of the MTC track 30 is defined as "–12" (7FF4hex). If TLC=1 and MTA bit 14=1, it signifies the track is the MTC track. If TLC=1 and MTA bit 14=0, it signifies the track is a DMT track. The track starting address (TSA) is the lowest numbered logical sector address on the corresponding track. The very first good sector on the respective track will be internally identified by the TSA number. The sector size code (SSC) is a two bit field that indicates the number of data bytes in the data field that follows in the sector. The SSC codes are listed in Table Ten. The SSC value is preferably constant for all sectors on a single track.

TABLE TEN

SECTOR SIZE CODE (SSC)

| 0 | reserved |
|---|----------|
| 1 | 256 byte sectors |
| 2 | 512 byte sectors |
| 3 | 1024 byte sectors |

Beginning with track zero, the TSA will be zero, and the TSA for each track will be observed to be incremented by the number of good sectors on the previous track. (Normally, the number of sectors will be the full compliment.) The track sector count (TSC) represents the number of good sectors on the corresponding track. The logical sector addresses on the corresponding track will therefore range from TSA to TSA+TSC–1. A track sector offset (TSO) is normally in the range of zero to TSC–1. However, a TSO=–1 indicates a deleted sector area, and a TSO=–2 indicates a refdex sector. Control programs that do not incorporate refdex handling will ignore the TSO=–2 and regard it as marking a deleted sector. The TSO is the offset of the logical address of this sector from the lowest starting address of the corresponding data track. Therefore, each ID field has all the information needed to completely identify a sector by its surface, track, and sector number. (For example, if TSA=150 and TSO=5, then this is the ID for logical sector address 155.) For all the sectors on a track, the ID fields will be the same, except the one byte that will distinguish a sector from all the other sectors on the same track will be the TSO. The MTA is very useful in determining whether a seek operation has resulted in a seek to the expected track.

The data field immediately follows the ID field. The data field format is listed below in Table Eleven and consists of the data preamble (sixteen bytes of 2T), a sync pattern (identical to that of the ID field), a data field type code (one byte of $B0_{hex}$), data, an error detecting code (EDC), an error correcting code (ECC), and a pad (~1.5 bytes).

TABLE ELEVEN

DATA FIELD FORMAT

Preamble
Sync Pattern
Data Field Type Code
Data
EDC
ECC
Pad

The EDC is computed on the data field type and data bytes. The ECC is computed on the data field type, data, and EDC bytes. The preferred EDC polynomials are $X^{16}+X^{12}+X^5+1$ and $X^{32}+X^{30}+X^{24}+X^{18}+X^{14}+X^8+X^7+X^2+1$. The preferred initialization value for both polynomials is zero. The ECC is a commercially licensed polynomial from Cythera Corporation (San Jose, Calif.) under U.S. Pat. No. 4,782,490 issued Nov. 1, 1988 to Grigory Tenengolts. The purpose of using the two codes in the above way is to reduce the undetected bit error rate (to one in $10^{48}$ by one estimate) The length of the respective EDC and ECC polynomials is dependant on the data size. For 256 byte data, the EDC is two bytes and the ECC is eight bytes long. For 512 and 1024 byte data, the EDC is four bytes and the ECC is twenty bytes long. The ECC is an interleaved ECC, and the basic polynomial is four bytes long. The ECC is capable of correcting any two bytes within its basic range of 255 bytes. For greater range in handling 256 byte data (that includes field type and EDC), a two-way interleave must be provided. For 512 and 1024 data fields, a five-way interleave is preferably used. The ECC uses a byte wide computation and passes it through a discrete ECC checker in byte wide form. Up to ten consecutive bytes of error can be corrected by the above.

Table Twelve, below, describes a disk mapping table (DMT) that is placed in the innermost pair of data tracks (the cylinder closest to the reference tracks 32 and 32'). Each track must have a minimum of twelve good sectors. Otherwise, the next outer pair of data tracks are taken for use by the DMT and the previous two tracks have all of their sectors declared as bad. If within the first ten cylinders, the minimum number of good sectors cannot be found, the entire diskette is rejected as being bad. Duplicate copies of the DMT of Table Twelve are written in all of the sectors (on both the servo and nonservo sides) of the innermost acceptable data cylinder (referred to below as the DMT tracks). After the DMT tracks (and moving toward the more outward tracks), there is an area that may be null (if not reserved by a vendor), a reassignment area comprising 0–255 sectors, and the (ordinary) data area. In all, there are 1530 tracks.

TABLE TWELVE

DISK MAPPING TABLE

| byte | DESCRIPTION |
|---|---|
| 0 | MTC 31–24 |
| 1 | MTC 23–16 |
| 2 | MTC 15–8 |
| 3 | MTC 7–0 |
| 4 | 0  \| X \| X \|  SSC |
| 5 | Test \|  X  \| Sector Interleave |
| 6 | (reserved) |
| 7 | (reserved) |
| 8 | TTC 7–0 |
| 9 | TTC 15–8 |
| 10 | RSA 7–0 |
| 11 | RSA 15–8 |
| 12 | 0  \|    RSA 19–16 |
| 13 | DSA 7–0 |
| 14 | DSA 15–8 |
| 15 | 0  \|    DSA 19–16 |
| 16 | TSC 7–0 |
| 17 | TSC 15–8 |
| 18 | 0  \|    TSC 19–16 |
| 19 | |
| | Reserved |
| 255 | |
| 256 | USN |
| 257 | |
| | Reserved |
| 258 | |
| 259 | |
| | Reassignment Table Entries (three bytes each) |
| 1023 | |

The DMT outlines where each of the above areas are and gives important information about the contents of the areas. The first four bytes of the DMT are the media type code (MTC), described above. The four bytes of MTC in the DMT merely repeat the MTC track information for convenience. Byte four contains zero in the high order four bits and the SSC (sector size code, defined above) for the data sectors in the low order two bits. Bits marked "x" are reserved. All such reserved areas are initialized as zero. Byte five contains the sector interleave factor. (Zero equals a one-to-one interleave, one indicates two-to-one interleave, and so on.) Byte five also contains a test bit that is used to mark diskettes used for diagnostic purposes only. Bytes eight and nine contain the total track count (TTC), which is the total number of tracks that were formatted during the formatting procedure (above) and will normally be 1530. (Short formats are possible.) This number will include tracks that were rejected during the DMT placement and the DMT tracks themselves. Bytes ten through twelve contain the reassignment start address (RSA), which is the logical sector address of the start of the reassignment area. Normally this area will immediately follow the second DMT track, but is not required. Bytes thirteen through fifteen contain the data area start, which is the logical sector address of the start of the data area. The reassignment sector count (RSC) is the number of reassignment sectors and is equal to DSA–RSA. RSC must be less than or equal to 255. The preferred value is two percent of the formatted data sectors or 250, whichever is less. Bytes sixteen through eighteen is the total sector count (TSC), and represents the total number of good sectors that were formatted, including the DMT sectors, vendor sectors (if any), reassignment sectors, and data sectors. Byte 256 is the update sequence number (USN) that serializes the number of times the reassignment table has been updated, or rewritten, since the initial formatting. The update count can vary between DMT sectors on a DMT track, but the one with the highest update count will be regarded as the most current. Bytes 259 through 1023 contain the 255 entries of the reassignment table. Each reassignment table entry is three bytes long, and contains some coded information and a logical block address (LBA). The LBA defines the sector in the data area that is reassigned as LBA=LSA–DSA, where LSA is the logical sector address of the reassigned sector. (Note: vendor sectors, if any, are not reassignable.) Each table entry corresponds to a sector in the reassignment area such that entry zero (bytes 259–261) corresponds to sector RSA, entry one to sector RSA+1, and so forth. Table Thirteen describes the reassignment entry format. (Where X equals 259 plus three times the entry number.)

TABLE THIRTEEN

REASSIGNMENT ENTRY FORMAT

| | | | |
|---|---|---|---|
| x+0 | | LBA 7–0 | |
| x+1 | | LBA 15–8 | |
| x+2 | RC | 0 | LBA 19–16 |

The reassignment code (RC) is initially set to three (and LBA to zero), which indicates that the entry and corresponding sector are available for use. When a data sector is reassigned, RC is set to zero and LBA is set to LSA–DSA (as described above). If the reassignment sector subsequently becomes defective and is reassigned, RC is set to two and the LBA is copied to the next available reassignment table entry. Reassignment table entries may be allocated in any desired order.

In an exemplary embodiment that includes an industry standard small computer systems interface (SCSI) the first SCSI logical block will access the outermost track (the track with the highest MTA). Successively higher SCSI block numbers will cause the inner tracks to be accessed.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A disk drive for use with a floppy diskette that has magnetically recorded on its surfaces a plurality of data tracks recorded between optical servo grooves, at least one reference track, one media type code (MTC) track and one diskette mapping table (DMT) track having a repetition of a portion of the information encoded in said MTC track, the disk drive comprising:

magnetic reading and servo positioning means for finding a nominal center radial position of said at least one reference track on said floppy diskette when installed in the disk drive and for storing data related to said nominal center radial position for later servo access of said data tracks;

diskette introduction means for causing the magnetic reading and servo positioning means to store said representation of said nominal center radial position and to read data from said DMT track on said floppy diskette after its being introduced to the disk drive; and diskette mapping table access means for reading and writing said DMT track with information related to said floppy diskette installed in the disk drive including information representing the number of tracks formatted, the number of bytes per nominal sector on said tracks, the total number of good usable sectors, the interleave of sectors, the starting address of a reassignment area, the starting address of a general data area, the number of sectors available for a reassignment, a sector reassignment table, the number of times said diskette mapping table has been updated, a media type code information with said floppy diskette physical characteristic information, and descriptors for communicating predetermined operational performance and operational restrictions of said floppy diskette;

wherein, the diskette introduction means includes means for placing a disk mapping table (DMT) in an innermost pair of data tracks on a cylinder closest to said reference tracks, wherein each track has a minimum of twelve viable sectors, otherwise, a next outer pair of said data tracks are used for said DMT and said previous two data tracks are encoded to declare all sectors as bad, and including means for making duplicate copies of said DMT which are then written in all sectors of an innermost acceptable data cylinder; and wherein said DMT includes:

a first four bytes for representing a media type code (MTC) that repeat information in said MTC track;

a fifth byte that includes a zero in a high order four bits and a sector size code (SSC) for the data sectors in a low order two bits;

a sixth byte includes a sector interleave factor, wherein "zero" indicates a one-to-one interleave, "one" indicates two-to-one interleave, and further includes a test bit for marking floppy diskettes for diagnostic purposes only;

a seventh and eighth byte are not used;

a ninth and tenth byte contain a total track count (TTC), which is the total number of tracks formatted during a formatting procedure and includes a count of any tracks that may have been rejected during said DMT placement and said DMT tracks;

an eleventh through thirteenth byte for recording a reassignment start address (RSA), which is the logical sector address of a start of a reassignment area;

a fourteenth through sixteenth byte representing a logical sector address of a start of a data sector area (DSA), wherein a reassignment sector count (RSC) representing the number of reassignment sectors is equal to DSA–RSA;

a seventeenth through nineteenth byte for representing a total sector count (TSC), which indicates the total number of good sectors that were formatted, including said DMT sectors, any vendor sectors, reassignment sectors, and data sectors;

a twentieth through two-hundred-and-fifty-sixth byte are not used;

a two-hundred-and-fifty-seventh byte for representing an update sequence number (USN) that serializes the number of times said reassignment table has been updated, or rewritten, since an initial formatting, wherein said update count may vary between DMT sectors on said DMT track and the one with a highest update count is regarded the most current; and a two-hundred-and-sixtieth through one-thousand-and-twenty-third byte for said reassignment table with a logical block address (LBA) that defines a sector in said data area and reassigned as LBA=LSA–DSA, where LSA is a logical sector address of a reassigned sector.

* * * * *